United States Patent [19]

Fuchs et al.

[11] 4,194,883
[45] Mar. 25, 1980

[54] WATER-SOLUBLE DISAZO DYESTUFFS AND PROCESS FOR COLORING SYNTHETIC POLYAMIDE FIBRES WITH THEM

[75] Inventors: Hermann Fuchs, Kelkheim; Klaus Filzinger, Hofheim, both of Fed. Rep. of Germany

[73] Assignee: Hoechst Aktiengesellschaft, Frankfurt am Main, Fed. Rep. of Germany

[21] Appl. No.: 936,184

[22] Filed: Aug. 23, 1978

Related U.S. Application Data

[63] Continuation of Ser. No. 858,438, Dec. 7, 1977, abandoned, which is a continuation-in-part of Ser. No. 833,986, Sep. 16, 1977, abandoned, which is a continuation of Ser. No. 641,929, Dec. 18, 1975, abandoned.

[30] Foreign Application Priority Data

Dec. 20, 1974 [DE] Fed. Rep. of Germany ....... 2460466

[51] Int. Cl.$^2$ .......................... C09B 27/00; D06P 1/02
[52] U.S. Cl. ...................................... 8/41 B; 260/186; 260/187
[58] Field of Search .................. 8/41 B; 260/187, 186

[56] References Cited

U.S. PATENT DOCUMENTS

| | | | |
|---|---|---|---|
| 2,778,817 | 1/1957 | Grandjean | 260/187 |
| 2,813,855 | 11/1957 | Bossard et al. | 260/187 |
| 3,676,050 | 7/1972 | James | 8/41 B |
| 3,904,596 | 9/1975 | Blackwell et al. | 8/21 C |
| 3,932,376 | 1/1976 | Feeman | 260/186 |
| 3,960,831 | 6/1976 | Nickel et al. | 260/187 |

FOREIGN PATENT DOCUMENTS 1304622  8/1962  France ..................... 260/187
701709  12/1953  United Kingdom .

OTHER PUBLICATIONS

Venkataraman, K., "The Chemistry of Synthetic Dyes," (Academic Press), vol. 1, 1952, p. 270.

*Primary Examiner*—A. Lionel Clingman
*Attorney, Agent, or Firm*—Curtis, Morris & Safford

[57] ABSTRACT

Water-soluble disazodyestuffs of the formula

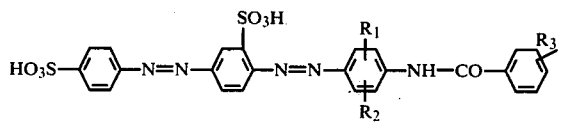

in which $R_1$ and $R_2$ are identical or different and each is hydrogen, methyl, ethyl or methoxy, and $R_3$ is hydrogen, chlorine, nitro or alkyl of 1 to 4 carbon atoms, and their salts have been found which possess very good dyeing characteristics and are very well suitable for dyeing of synthetic polyamides and yield dyeings on these fibers with good to very good wet fastnesses and fastnesses to processing and to use. In accordance with this, an improved process had been found for coloring synthetic polyamide fibres by applying the above dyestuffs of the invention on said fibres in usual dyeing and printing methods and fixing them on the fibre by methods as usual in the art.

4 Claims, No Drawings

WATER-SOLUBLE DISAZO DYESTUFFS AND PROCESS FOR COLORING SYNTHETIC POLYAMIDE FIBRES WITH THEM

This is a continuation of application Ser. No. 858,438, filed Dec. 7, 1977 now abandoned, which application was a continuation-in-part of copending application Ser. No. 833,986, filed Sept. 16, 1977, now abandoned, which application Ser. No. 833,986 was a continuation of copending application Ser. No. 641,929, filed Dec. 18, 1975, now abandoned.

New water-soluble disazo dyestuffs were found which in the form of the free acid correspond to the general formula (1)

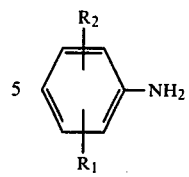
(3)

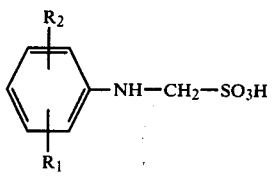
(4)

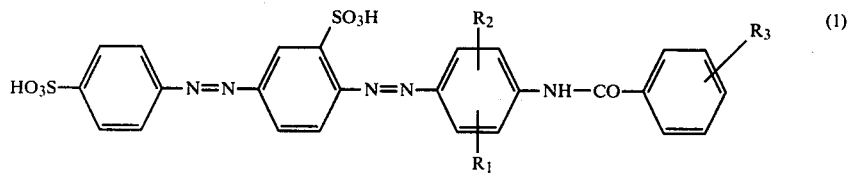
(1)

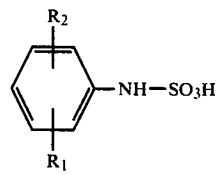
(5)

in which the radicals $R_1$ and $R_2$ are identical or different, each representing a hydrogen atom, a methyl, ethyl or methoxy group, and the radical $R_3$ stands for a hydrogen or chlorine atom, for a nitro group or an alkyl group of 1 to 4 carbon atoms, such as for example the methyl, iso-propyl or tert.-butyl group. The dyestuffs are preferably used in form of their sodium, potassium or ammonium salts.

The new compounds are prepared according to the invention by coupling the diazo compound of 1 mol of 4-amino-azobenzene-3,4'-disulfonic acid of the formula (2)

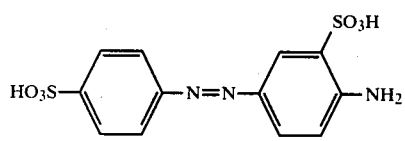
(2)

with 1 mol of the following coupling components (3), (4) or (5)

to yield the disazo dyestuffs of the formulae (6), (7) or (8)

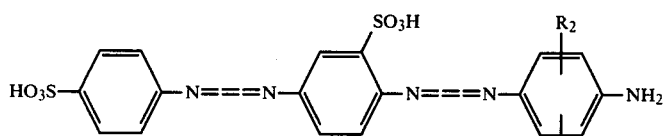
(6)

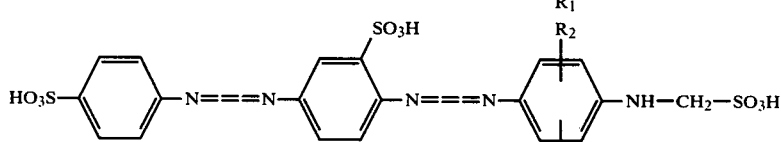
(7)

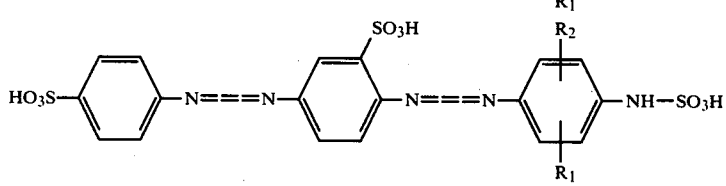
(8)

then splitting off the sulfo or sulfomethylene group in the dyestuffs of formulae (7) and (8) by acid or alkaline hydrolysis to yield the dyestuffs of formula (6), and then reacting subsequently the dyestuffs of the formula (6) with the acid chloride of the formula (9)

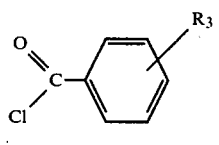
(9)

in the presence of an acid binding agent at a temperature of between 0° to 25° C. and at a pH in the range of 6.0 to 9.0, preferably between pH 7.5 and 8.5.

As coupling components of the general formula (3), respectively the derivatives corresponding to the general formulae (4) or (5), the following ones are preferably used: Aniline, 2- and 3-methylaniline, 2,5-dimethylaniline, 3-ethylaniline, 2- and 3-methoxyaniline.

Acid chlorides of the general formula (9) are for example:

Benzoylchloride, 4-toluylchloride, 3- and 4-chlorobenzoylchloride, 3- and 4-nitrobenzoylchloride, 4-isopropyl-benzoylchloride and 4-tert.-butyl-benzoylchloride.

The present invention concerns furthermore the use of the new disazo dyestuffs for the dyeing of synthetic polyamide fibers, especially those of caprolactam of hexamethylendiamine and adipic acid or of polycondensation products obtainable from ω-amino-undecanoic acid.

The dyestuffs are used as free acids or as salts. They may also be used in mixture with other suitable dyestuffs for dyeing synthetic polyamide fibers. The dyebaths contain per 1000 parts by weight of the dyebath 0.01 to 20 parts by weight of dyestuff, 0.05 to 10 parts by weight of usual dyeing auxiliaries and 0.05 to 10 parts by weight of usual dispersants. The batches are chosen in such a way that the dyeing bath is neutral or acid. By addition of 0.01 to 20 parts by weight of an acid, for example of formic acid or acetic acid or also of mineral acid, or alkali salts, as sodium salts, of the formic or acetic acid to the dye-bath, dyeing can be carried out in a weak to strong acid but preferably in a weakly acid or neutral bath (pH 4 to 7) and advantageously at a temperature between 80° and 105° C., optionally between 90° and 105° C.

For local dyeing by printing, aqueous printing pastes are used which contain per 1000 parts by weight generally 1–50 parts by weight of dyestuff, 250 to 700 parts by weight of a usual aqueous thickening agents such as, for example, crystal gum, 1 to 50 parts by weight of usual printing auxiliaries, 1 to 50 parts by weight of usual dispersants and 5 to 50 parts by weight of a salt of a weak base and a strong mineral acid or organic acid, for example, ammonium sulfate or ammonium tartrate, and water. The printed fabrics are dried and treated for a short time with hot air or steam.

According to this process applied on synthetic polyamide fibers, yellow to yellow-brown shades with good to very good fastnesses to wet, for example, fastness to washing at 40° C. and 60° C., generally called washing test 1 and 3 in DIN 54 014 and DIN 54 010, to water under severe conditions (DIN 54 006), to alkaline and acid perspiration, to hypochlorite bleach mild (DIN 54 034) and to hypochlorite bleach severe (DIN 54 035), to chlorinated water, to rubbing in the dry or wet state, to fulling in acid and alkaline medium, fastness to steaming, fastness to alkali and to acid, to decatizing, to dry-heat pleating and setting, to dry cleaning, as well as with excellent fastness properties to light in xenotest- and day-light were obtained.

The dyestuffs excell by a good build-up property and good properties to migration, thus permitting to obtain deep dyeings with good evenness.

Together with selected yellow, red and blue acid dyes, the new dyestuffs are very suitable for the dyeing of blended dye shades with excellent fastness properties to light.

The following examples illustrate the invention. Parts and percentages are by weight.

EXAMPLE 1

35.7 Parts of 4-aminoazobenzene-3,4'-disulfonic acid in form of the neutral alkali salt were stirred into 150 parts of water and added to 6,9 parts of sodium nitrate, and the whole was poured slowly into a mixture of 100 parts of ice and 32 parts of a 31% hydrochloric acid. For the decomposition of nitrous acid in excess, a small quantity of amido-sulfonic acid was added after 3 hours. The suspension of the diazosalt was then adjusted with waterfree sodium carbonate at a pH value of 2.5 and brought to reaction with a solution of 20.1 parts of m-toluidine-N-methanesulfonic acid in 100 parts of water. The pH value was then adjusted to 4.5 with waterfree sodium carbonate and kept until complete coupling. Afterwards, 48 parts of a 31% hydrochloric acid were added, and the whole was heated during 2 hours under reflux. After cooling to room temperature, the product was filtered and washed with water. The moisty filter-cake was mixed with 200 parts of water and diluted with an aqueous 33% solution of sodium hydroxide at pH 8.5. By a dropwise addition of 15 parts of benzoylchloride while keeping at the same time the pH value at 8.0–8.5 by means of waterfree sodium carbonate, a yellow dyestuff of the following formula was obtained:

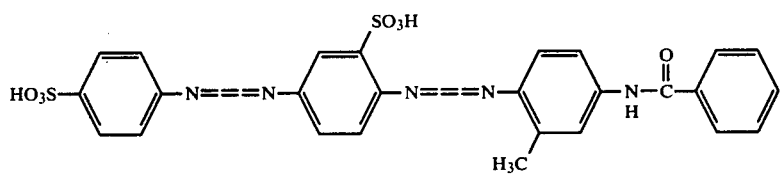

By adding sodium chloride, the partially crystallized dyestuff was completely precipitated and isolated by filtration.

DYEING EXAMPLE 100 parts of a polycaprolactam fabric were put into a bath having a temperature of 40° C.; the bath contained:
1.5 parts of the above mentioned dyestuff,
0.15 parts of the addition product of 12 mol of ethylenoxide on 1 mol of stearylamine,
0.40 parts of the condensation product of 1 mol cyanochloride (trichloro-s-triazine),
3 mol of aniline-3-sulfonic acid,
2.0 parts of ammonium acetate and
1.0 part of an aqueous 60% by weight acetic acid and 3000 parts of water.

The temperature of the dyebath was raised within 15 minutes up to 98°–100° C., and dyeing was continued for 60 minutes at 100° C. After the usual finishing, a yellow dyeing with good to very good fastness to wet such as for example, fastness to water under severe conditions, to washing at 40° C. and 60° C., fastness to perspiration in alkaline and acid medium, to steaming, to alkali and to acid, and with an excellent fastness to xenotest- and to day-light was granted.

EXAMPLE 2

35.7 Parts of 4-aminobenzene-3,4'-disulfonic acid in form of the neutral alkali salt were stirred into 150 parts of water. The solution was added to 6.9 parts of sodium nitrite, and the whole poured slowly, whilst stirring, into a mixture of 100 parts of ice and 32 parts of a 31% hydrochloric acid. For the decomposition of nitrous acid in excess, a small quantity of amidosulfonic acid was added after 3 hours. The suspension of diazo salt was then adjusted with waterfree sodium carbonate at a pH value of 2.5 and brought to reaction with a solution of 21.7 parts of 2-methoxy-aniline-N-methansulfonic acid in 100 parts of water. The pH value was then adjusted with water-free sodium carbonate to 3.5–4.0 and kept at this value until complete coupling. Afterwards, 48 parts of a 31% hydrochloric acid were added, and the whole was heated under reflux for 2 hours. After cooling to room-temperature, the dyestuff was separated by filtration and washed with water.

The moisty filter cake was stirred with 200 parts of water and dissolved with an aqueous 33% by weight sodium hydroxide solution at a pH 8.5. By a dropwise addition of 20 parts of 4-chlorobenzoylchloride while the pH was kept with waterfree sodium carbonate at 8.0 to 8.5, a dyestuff of the following formula was obtained:

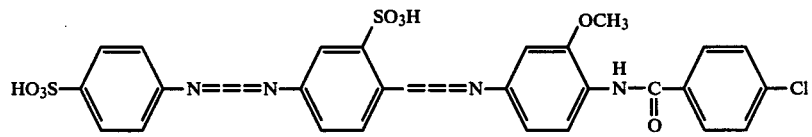

The dyestuff was separated by salting out with sodium chloride and isolated by filtration.

Dyeing Example

A polycaprolactam fabric was printed with an aqueous paste per 1 Ug. 10 parts of the abovementioned dyestuff, 30 parts of dibutylglycol, 250 parts of water, 650 parts of an aqueous crystal gum thickener, 30 parts of nitro-benzene-3-sulfonic acid and 30 parts of ammoniumsulfate. The printed fabric was dried and steamed during 30 minutes at 100°–102° C. After a subsequent rinsing and drying, finishing was effected as usual. The golden-yellow print has an excellent fastness to light and possesses good general fabrication fastnesses.

EXAMPLE 3

Diazotation of the 4-aminoazobenzene-3,4'-disulfonic acid was effected as indicated in Example 1, and the diazo suspension was brought in reaction with solution of 12.1 parts of 2,5-dimethylaniline and 15 parts of a 31% hydrochloric acid in 150 parts of water while the pH value was kept with waterfree sodium carbonate at 2.8–3.2 until complete coupling. A dye-stuff was obtained, which, after reaction with 25 parts of 4-tert-.butylbenzoylchloride corresponding to Example 1 at a pH of 8.0–8.5, yielded a golden-yellow dyestuff of the following formula:

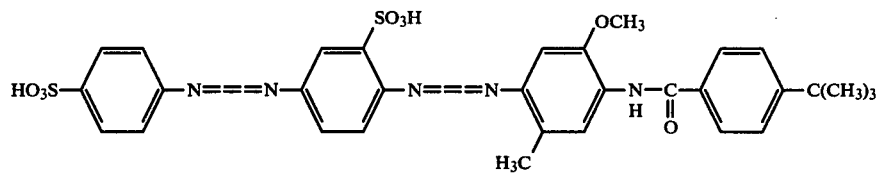

Dyeing Example

100 Parts of a tufted carpet of polyamide fibres, preheated at 100° C. in saturated steam, run during 5 minutes through a hot solution of 100°–102° C., containing 15 parts of the abovementioned dyestuff, 0.3 parts of the addition product of 12 mol of ethylenoxide on stearylamine, 2 parts of sodium acetate and 1 part of acetic acid per 1000 parts of water. Subsequently it was rinsed and dried. An even golden-yellow dyeing with excellent fastness to light and good general fastnesses was obtained.

The same coloristic result was obtained with tufted felt carpets.

EXAMPLE 4

To a suspension of diazotized 4-aminoazobenzene-3,4'-disulfonic acid as prepared in Example 1, a solution of 17.3 parts of aniline-sulfamide acid in form of the ammonium salt in 100 part of water was added, and the pH value was adjusted with waterfree sodium carbonate at 3.5–4.0. After complete coupling, 48 parts of a 31% hydrochloric acid were added and the whole was heated during 3 hours under reflux. The precipitated dyestuff was separated by filtration and washed with water. The moisty filtercake was dissolved in 200 parts of water with an aqueous 33% by weight sodium hydroxide solution at a pH of 8.5. The solution was then slowly brought to reaction with 25 parts of 3-nitrobenzoylchloride, whereby the pH value was kept at the same time with waterfree sodium carbonate at 8.0 to 8.5. The dyestuff of the following formula was isolated by salting out with sodium chloride and separation by filtration:

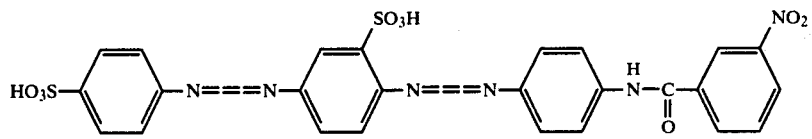

Dyeing Example

A polyamide carpet yarn was treated with a padding liquor up to a liquor pick-up of 100% by weight, whereby 1000 parts of the padding liquor contained 10 parts of the dyestuff of the above formula, 5 parts of a locust bean flour preparation, 4 parts of an addition product of 8 mol of ethylenoxide on 1 mol of iso-tridecyl alcohol and 15 parts of an aqueous 60% by weight acetic acid. The padded yarn was subsequently steamed during 6 minutes at 100°–120° C. and rinsed with cold water. The dyeing possesses very good general fastnesses and an excellent fastness to light.

The following table contains further dyestuffs which were prepared and dyed according to the abovementioned examples and show good general fastnesses of the dyeings.

| Example No. | Formula | Shade on polyamide fiber |
|---|---|---|
| 5 | | yellow |
| 6 | | golden-yellow |
| 7 | | golden-yellow |
| 8 | | yellow |
| 9 | | golden-yellow |
| 10 | | yellow |
| 11 | | yellow |

We claim:

1. In a process for colouring a synthetic polyamide fibre material wherein an acid dyestuff is applied on this material by dyeing or printing methods as usual in the art, and fixed on that fibre material by methods as usual in the art, the improvement consists of using as an acid dyestuff a water-soluble disazo dyestuff which, in the form of the free acid, corresponds to the formula

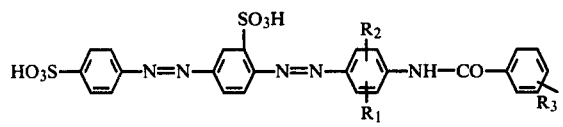

in which $R_1$ and $R_2$ are identical or different from each other and each is hydrogen, methyl, ethyl or methoxy, and $R_3$ is hydrogen, chlorine, nitro or alkyl of 1 to 4 carbon atoms.

2. A process according to claim 1, wherein colouring of the polyamide fibre is effected by dyeing in a neutral or weakly acid aqueous dyebath at temperature of from 90° to 105° C.

3. A process according to claim 1, wherein colouring of the polyamide fibre is carried out by padding said fibre with an aqueous solution containing a dyestuff indicated in claim 5, drying said padded fibre material and fixing the dyestuff by a subsequent steaming process.

4. A process according to claim 1, wherein colouring of the polyamide fibre material is carried out by applying a printing paste containing a dyestuff as indicated in claim 5, on said fibre material, drying the printed material and fixing the dyestuff subsequently on the fibre material by a steaming process.

* * * * *